(12) United States Patent
Chen et al.

(10) Patent No.: US 7,330,349 B2
(45) Date of Patent: Feb. 12, 2008

(54) DOCKING APPARATUS

(75) Inventors: Yun-Lung Chen, Tu-Cheng (TW); Da-Long Sun, Shenzhen (CN); Chang-Jiang Hou, Shenzhen (CN)

(73) Assignees: Hong Fu Jin Precision Industry (Shenzhen) Co., Ltd., Bao-an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 436 days.

(21) Appl. No.: 11/018,219

(22) Filed: Dec. 20, 2004

(65) Prior Publication Data

US 2005/0280985 A1  Dec. 22, 2005

(30) Foreign Application Priority Data

Jun. 21, 2004  (CN) .................. 2004 2 0071023

(51) Int. Cl.
  *H05K 5/00* (2006.01)
  *F16M 13/00* (2006.01)
(52) U.S. Cl. ............... 361/686; 361/683; 248/424; 248/917
(58) Field of Classification Search ........... 361/686; 710/303, 304
See application file for complete search history.

(56) References Cited

U.S. PATENT DOCUMENTS

| | | | | |
|---|---|---|---|---|
| 5,568,359 | A | | 10/1996 | Cavello et al. ............ 361/686 |
| 5,699,226 | A | * | 12/1997 | Cavello ..................... 361/686 |
| 6,222,728 | B1 | * | 4/2001 | Jaggers et al. ............. 361/686 |
| 6,301,106 | B1 | * | 10/2001 | Helot et al. ................ 361/686 |
| 6,625,015 | B2 | * | 9/2003 | Yin ............................ 361/686 |
| 6,833,988 | B2 | * | 12/2004 | Kamphuis et al. ......... 361/681 |

* cited by examiner

*Primary Examiner*—Jayprakash Gandhi
*Assistant Examiner*—Zachary M Pape
(74) *Attorney, Agent, or Firm*—Morris Manning Martin LLP; Tim Tingkang Xia, Esq.

(57) ABSTRACT

A docking apparatus includes a port replicator (50), a base (30) for supporting the port replicator thereon, a fixing member (60), a resilient member (80), and a button (10). An accommodating hole (51) is defined in the port replicator, and a hole (351) is defined in the base corresponding to the accommodating hole of the port replicator. In use, the resilient member drives the fixing member upwardly to extend through the hole of the protrusion to engage in the accommodating hole of the port replicator thereby fixedly attaching the port replicator to the base. The button 10 is to drive the fixing member to retract from the accommodating hole of the port replicator to release the port replicator from the base.

17 Claims, 4 Drawing Sheets

DOCKING APPARATUS

BACKGROUND OF THE INVENTION

1. Field of the Invention

The present invention relates to a docking apparatus, and more particularly to a docking apparatus which has increased ease of use.

2. Description of the Related Art

To enable portable computers to be used in conjunction with desktop computer peripheral devices such as a printer, a scanner, a monitor, etc., a docking apparatus having a port replicator and a base is introduced to serve as an interface between portable computer and selected desktop peripheral devices. The port replicator is typically attached to the base via screws when in use. Such docking apparatus has been described in U.S. Pat. No. 5,568,359. However, it is boring and time-consuming to manipulate screws when attaching or detaching the port replicator to or from the base.

SUMMARY OF THE INVENTION

Accordingly, an object of the present invention is to provide a docking apparatus which has increased ease of use.

Another object of the present invention is to provide a docking apparatus which eliminates use of screws.

To achieve the above objects, a docking apparatus in accordance with the present invention comprises a base having a protrusion disposed on a bottom surface thereof, and a hole defined in the protrusion. A button is disposed below the base. A fixing member is slidable in the hole of the protrusion of the base. A resilient member is attached to the protrusion of the base. A port replicator is movably disposed on a top surface of the base, an accommodating hole is defined in the port replicator, and is adapted to be in alignment with the hole of the protrusion. In use, the resilient member drives the fixing member upwardly to extend through the hole of the protrusion to engage in the accommodating hole of the port replicator thereby fixedly attaching the port replicator to the base; the button is manipulated to drive the fixing member to move downward to retract from the accommodating hole of the port replicator, for detaching the port replicator from the base.

Other objects, advantages and novel features of the present invention will be drawn from the following detailed description of a preferred embodiment of the present invention with the attached drawings, in which:

DETAILED DESCRIPTION OF THE PRESENT INVENTION

Figure 1:
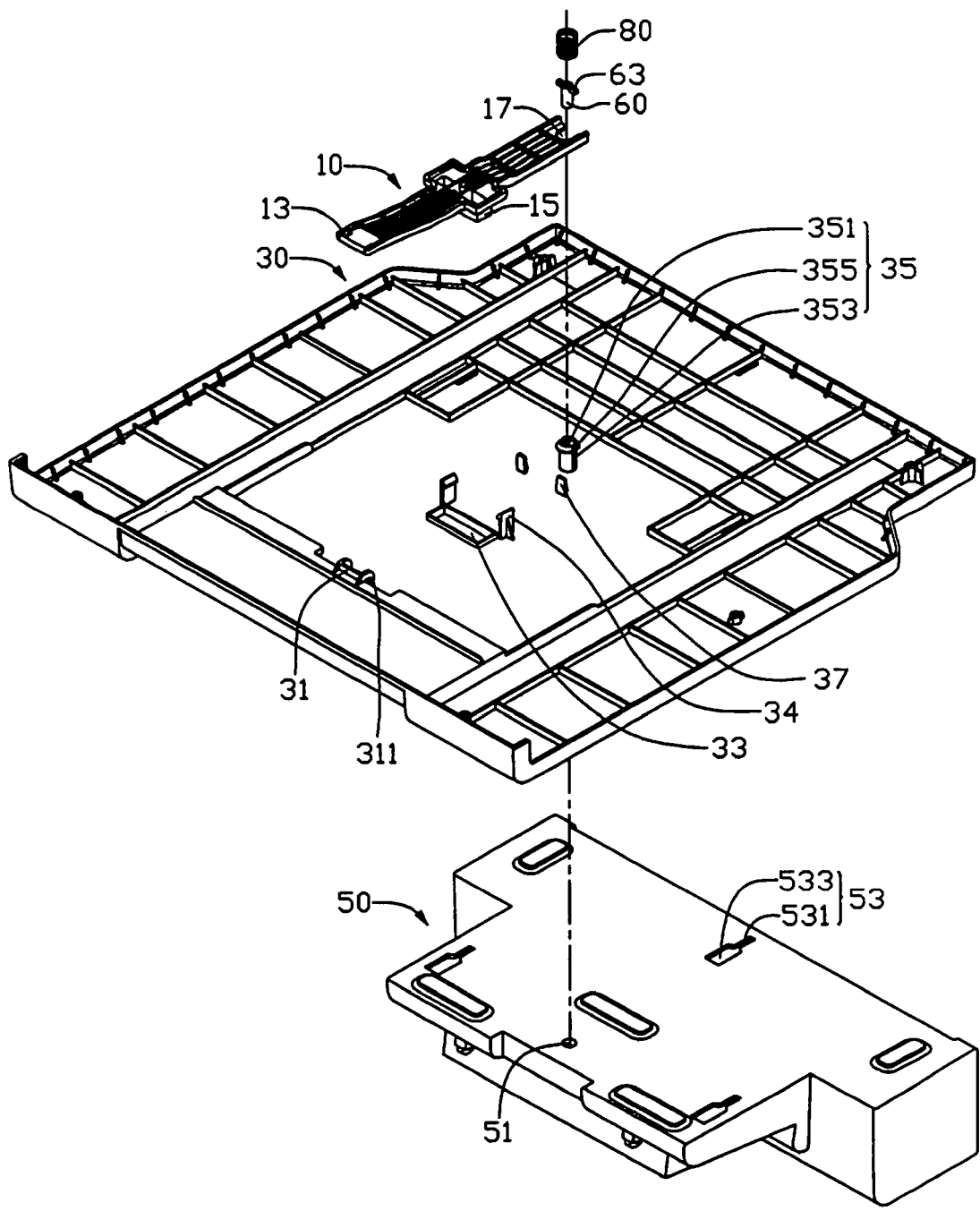
FIG. 1 is an exploded, isometric view of a docking apparatus in accordance with a preferred embodiment of the present invention.
Figure 2:
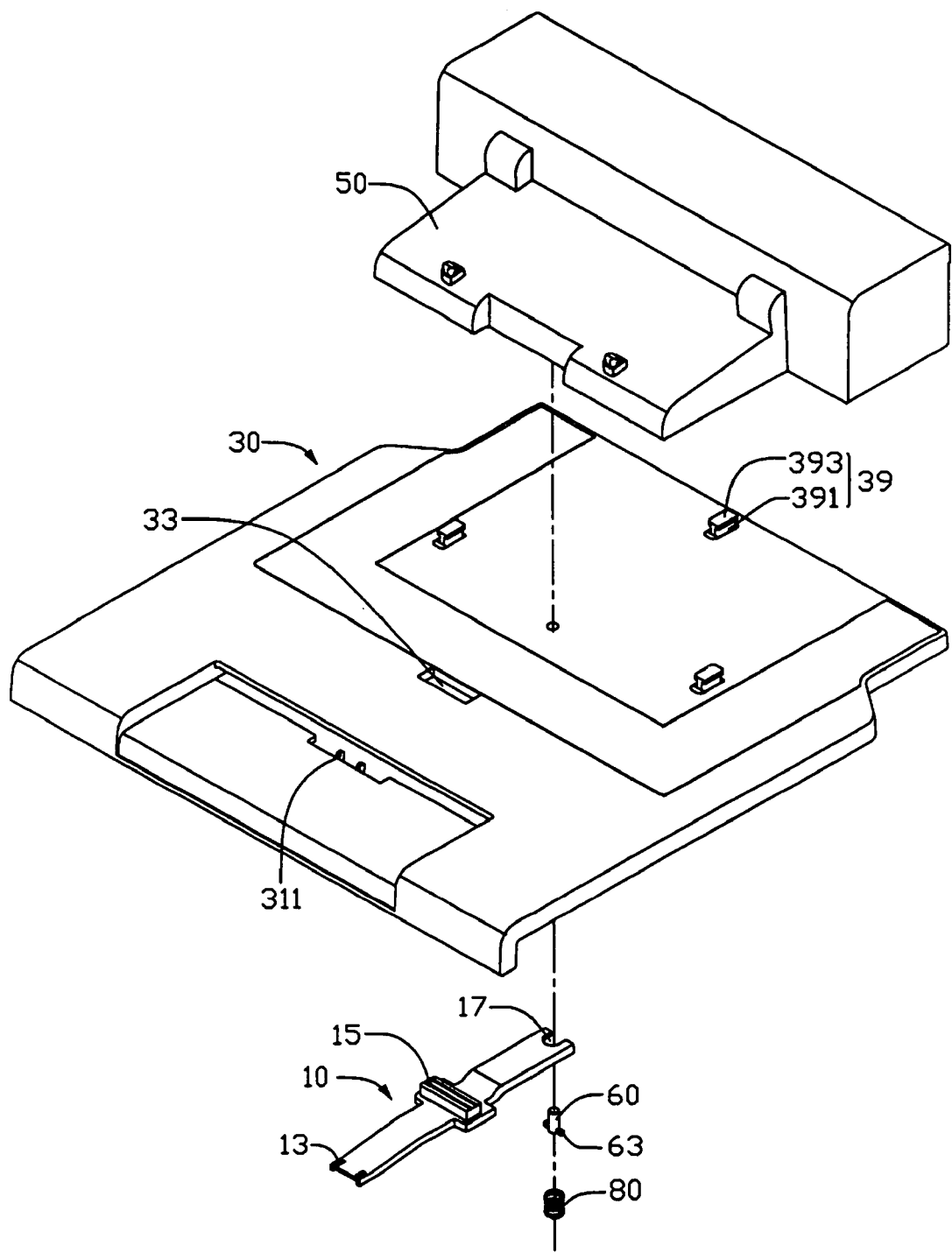
FIG. 2 is similar to FIG. 1, but viewed from another aspect.

Referring to FIGS. 1 and 2, a docking apparatus for an electronic device like a laptop in accordance with a preferred embodiment of the present invention comprises a port replicator 50, a base 30 for supporting the port replicator 50 thereon, a fixing member 60 for fixing the port replicator 50 on the base 30, a resilient member 80, and a button 10 for being manipulated to release the port replicator 50 from the base 30.

The base 30 comprises a generally rectangle plate. A fastener 31 is formed on a bottom surface of the base 30 adjacent a front edge thereof, and two hooks 311 are bent from the fastener 31 toward the bottom surface. An aperture 33 is defined in the base 30. A pair of spaced clips 34 is formed on the bottom surface adjacent the aperture 33. A pair of spaced tabs 37 depends from the bottom surface at rear of the clips 34. The fastener 31, the clips 34 and the tabs 37 cooperate to attach the button 10 to the bottom surface of the base 30. A protrusion 35 is extended downward from the bottom surface of the base 30 adjacent the tabs 37. An internal hole 351 is defined through the protrusion 35 and the base 30. A collar 355 is formed around a circumference of a free end of the protrusion 35. A pair of opposite parallel openings 353 is defined in a wall of the protrusion 35 from the free end thereof toward the bottom surface of the base 30. The openings 353 communicate with the hole 351.

Referring particularly to FIG. 2, three catches 39 are formed on a rear portion of a top surface of the base 30, each catch 39 comprising a vertical portion 391 extending upwardly from the base 30 and a horizontal portion 393 disposed on the vertical portion 391 and extending parallel to the base 30. The catches 39 help attach the port replicator 50 to the base 30.

The button 10 comprises a generally elongated plate. A pair of hook holes 13 is defined in a first end of the elongated plate, corresponding to the hooks 311 of the fastener 31 of the base 30. A generally semi-circular cutout 17 is defined in a second end of the elongated plate opposite to the hook holes 13, corresponding to the protrusion 35 of the base 30. A handgrip 15 is formed on a middle portion of the elongate plate, corresponding to the button hole 33 of the base 30.

The fixing member 60 comprises a cylindrical main body slidably received in the hole 351 of the protrusion 35. A pair of opposite projections 63 is extended outwardly perpendicular to the main body of the fixing member 60, corresponding to the openings 353 of the protrusion 35 of the base 30.

The port replicator 50 defines an accommodating hole 51 in a bottom surface thereof, for receiving the fixing member 60. Three catch holes 53 are defined in the bottom surface of the port replicator 50, corresponding to the catches 39 of the base 30. Each catch hole 53 comprises a relatively wide portion 533 and a relatively narrow portion 531 in communication with the wide portion 533.

In assembly and use of the docking apparatus, the button 10 is attached to the bottom surface of the base 30, with the handgrip 15 of the button 10 received in the button hole 33 of the base 30 and the protrusion 35 of the base 30 extending through the cutout 17 of the button 10. The hooks 311 of the fastener 31 engage in corresponding hook holes 13 of the button, and the clips 34 and the tabs 37 clasp the button 10. The fixing member 60 is then inserted in the hole 351 of the protrusion 35 of the base 30, with projections 63 thereof slidably received in the openings 353 of the protrusion 35 respectively. The resilient member 80 is attached to the protrusion 35 of the base 30, with opposite ends thereof being engaged with the collar 355 of the protrusion 35 and the projections 63 of the fixing member 60 respectively. In the preferred embodiment, the resilient member 80 is a coil spring.

Figure 3:
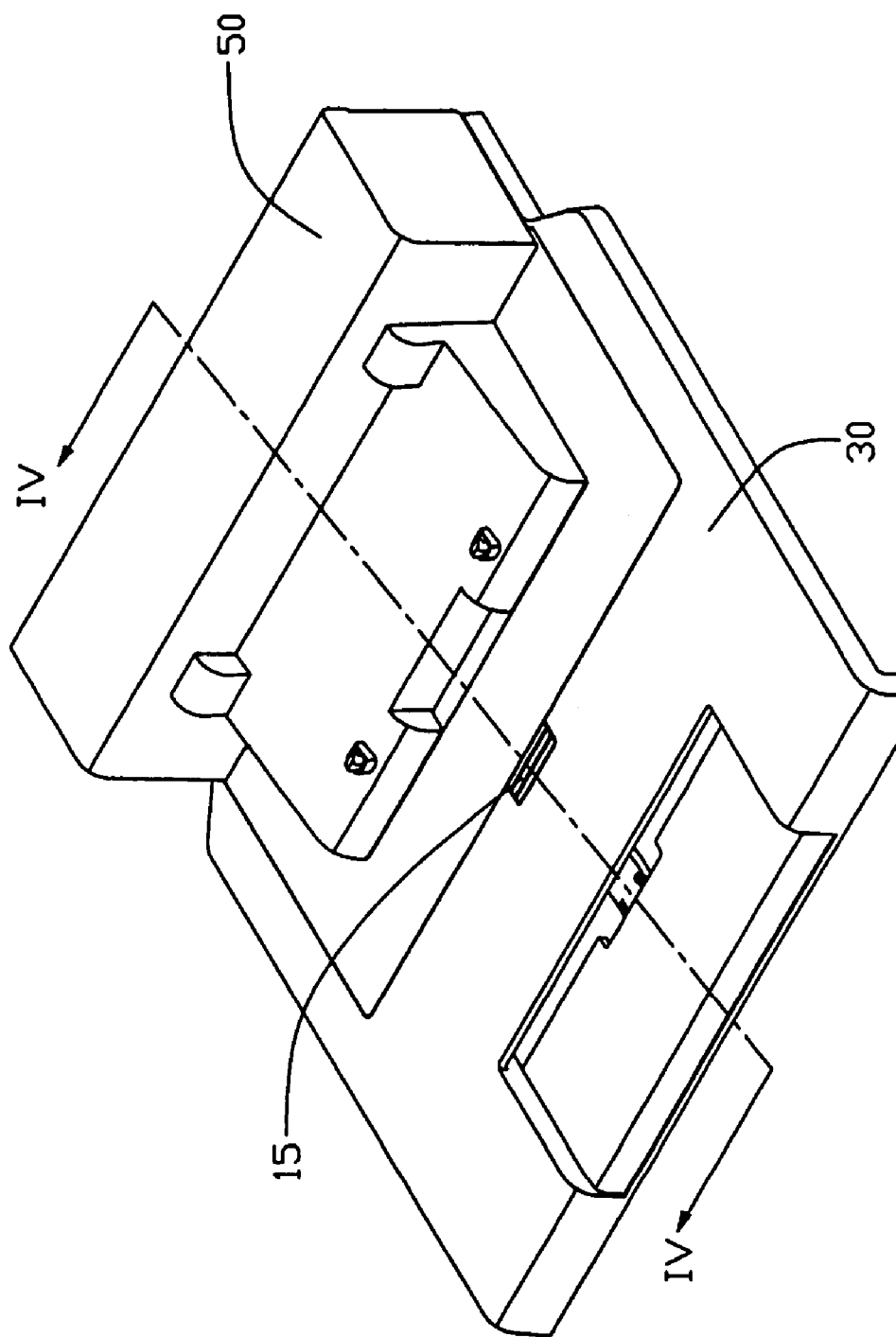
FIG. 3 is an assembled view of FIG. 2.
Figure 4:
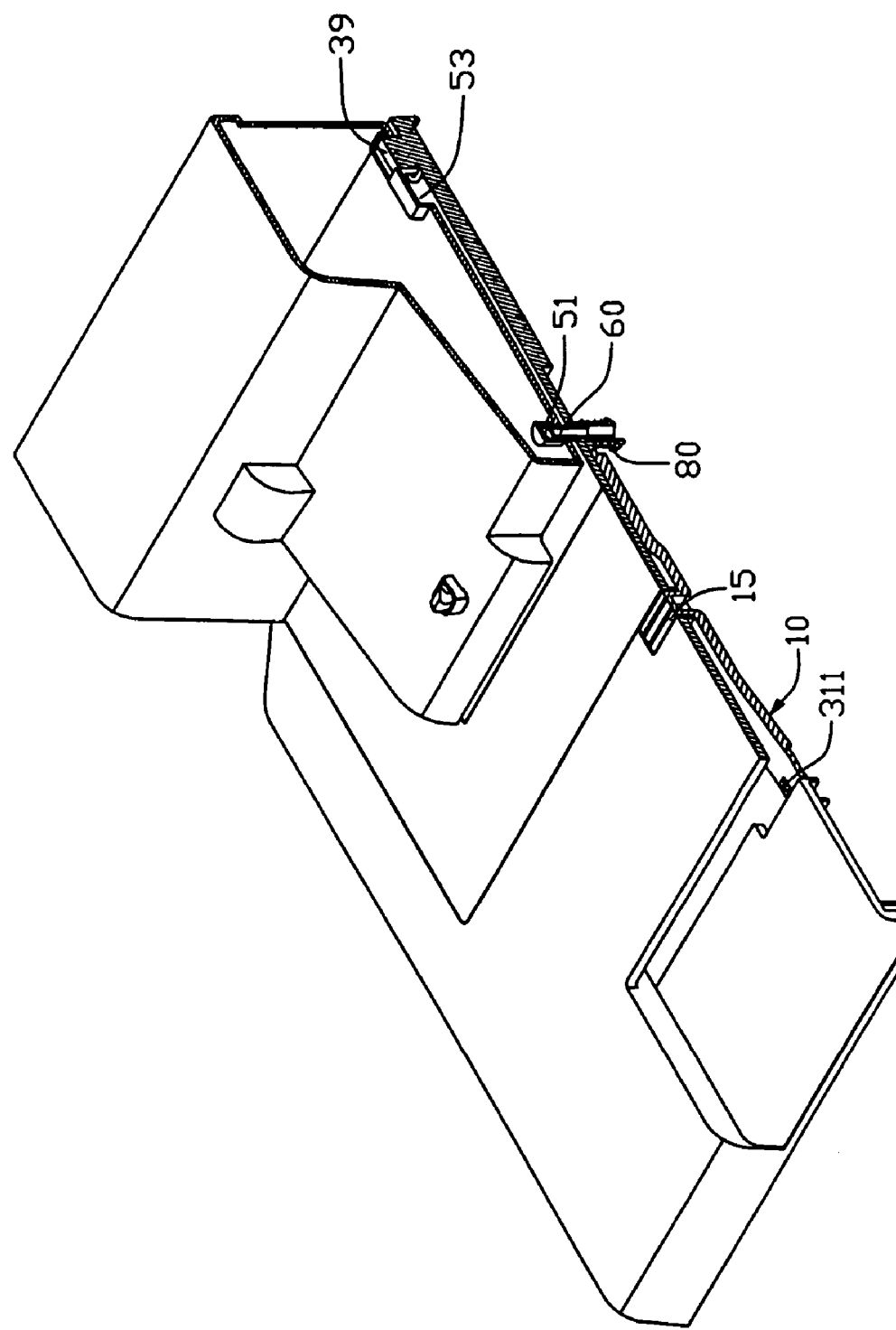
FIG. 4 is a cross-sectional view of FIG. 3 taken along line IV-IV thereof.

Referring to FIGS. 3 and 4, the catches 39 of the base 30 are received in the wide portions 533 of the catch holes 53 respectively, and are relatively moved to engage in the narrow portions 531 of the catch holes 53 respectively. The port replicator 50 is thus preliminarily fixed to the base 30, and the hole 351 of the protrusion 35 of the base 30 is in alignment with the accommodating hole 51 of the port replicator 50. The resilient member 80 drives the fixing member 60 at the projections 63 upwardly to engage in the accommodating hole 51 of the port replicator 50. The port replicator 50 is finally fixed to the base 30.

To detach the port replicator 50 from the base 30, the button 10 is pushed downward at the handgrip 15 to drive the second end to push the fixing member 60 downward at the projections 63 thereof. The fixing member 60 is thus retracted from the accommodating hole 51 of the port replicator 50, and the resilient member 80 is compressed. The port replicator 50 is pushed toward a rear end of the base 30, and the catches 39 of the base 30 are disengaged from corresponding narrow portions 531 of the catch holes 53 of the port replicator 50. The port replicator 50 is thus ready to be detached from the base 30.

While the present invention has been illustrated by the description of the preferred embodiment thereof, and while the preferred embodiment has been described in considerable detail, it is not intended to restrict or in any way limit the scope of the appended claims to such detail. Additional advantages and modifications within the spirit and scope of the present invention will readily appear to those skilled in the art. Therefore, the present invention is not limited to the specific details and illustrative examples shown and described.

What is claimed is:

1. A docking apparatus, comprising:
a base comprising a protrusion disposed on a bottom surface thereof, a hole defined in the protrusion;
a button disposed below the base;
a fixing member slidable in the hole of the protrusion of the base;
a resilient member attached to the protrusion of the base; and
a port replicator movably disposed on a top surface of the base, an accommodating hole defined in the port replicator and adapted to be in alignment with the hole of the protrusion;
wherein the resilient member drives the fixing member upwardly to extend through the hole of the protrusion to engage in the accommodating hole of the port replicator thereby fixedly attaching the port replicator to the base; the button is manipulated to drive the fixing member to move downward to retract from the accommodating hole of the port replicator, for detaching the port replicator from the base.

2. The docking apparatus as claimed in claim 1, wherein the button comprises a first end attached to the base and a second end movable relative the base.

3. The docking apparatus as claimed in claim 2, wherein the second end of the button defines a cutout, and the protrusion extends through the cutout of the button.

4. The docking apparatus as claimed in claim 3, wherein at least one hook is formed on the bottom surface of the base, a pair of clips is formed on the bottom surface of the base to clasp the button, and at least one hook hole is defined in the first end of the button corresponding to said hook of the base.

5. The docking apparatus as claimed in claim 4, wherein a handgrip is formed on the button between the first and second ends thereof, and a button hole is defined in the base to receive the handgrip of the button therein.

6. The docking apparatus as claimed in claim 1, wherein at least one opening is defined in a wall of the protrusion, at least one projection is formed on an end of the fixing member, and said projection is adapted to be slidable along said opening with a portion thereof extended out of the wall.

7. The docking apparatus as claimed in claim 6, wherein a collar is formed on a free end of the protrusion, and the resilient member is disposed between the collar of the protrusion and said portion of the projection of the fixing member.

8. The docking apparatus as claimed in claim 1, wherein at least one catch is formed on the top surface of the base, and at least one catch hole is defined in the port replicator to receive said catch.

9. A docking apparatus comprising:
a base comprising top and bottom surfaces, at least one catch formed on the top surface of the base, a through hole defined in the base;
a port replicator defining at least one catch hole in a bottom thereof to receive said catch of the base, an accommodating hole defined in the bottom of the port replicator, the port replicator slidable in a rear-to-front direction thereby preliminarily attaching the port replicator on the base;
a fixing member slidably received in the hole of the base and adapted to engage in the accommodating hole of the port replicator thereby finally attaching the port replicator on the base; and
a button constantly engaging the fixing member and capable of being manipulated to retract the fixing member from the accommodating hole for detaching the port replicator from the base.

10. The docking apparatus as claimed in claim 9, wherein said catch of the base comprises a vertical portion extending upwardly from the base and a horizontal portion disposed on the vertical portion, and said catch hole of the port replicator comprises a relatively wide portion and a relatively narrow portion in communication with the wide portion, corresponding to the horizontal portion and the vertical portion of said catch of the base respectively.

11. The docking apparatus as claimed in claim 9, wherein a protrusion depends from the bottom surface of the base, and the hole of the base is further extended through the protrusion.

12. The docking apparatus as claimed in claim 11, wherein a resilient member is fixed to the protrusion to constantly urge the fixing member toward the top surface of the base.

13. The docking apparatus as claimed in claim 9, wherein the button comprises a first end attached to the base and a second end movable relative to the base.

14. A docking apparatus comprising:
a base for providing a neighboring space for at least one electronic device;
a port replicator detachably attachable to said base so as to provide electrical connection toward said at least one electronic device in said space, said port replicator movable in a direction parallel to said base between a first position where said port replicator is securely fixed to said base and a second position where said port replicator is released to freely detach from said base; and
a button attached to said base, and having a handgrip exposable to said space for a user of said electronic device and a fixing member resiliently reachable to said port replicator, said fixing member reachably engagable with said port replicator in another direction perpendicular to said base to confine movement of said port replicator from said first position to said second position, and disengagable from said port replicator by means of driving of said user via said handgrip of said button so as to release said port replicator for moving to said second position.

15. The docking apparatus as claimed in claim 14, wherein a fastener is formed on said base adjacent to an edge thereof spaced from said port replicator, and said button engagably extends toward said fastener.

16. The docking apparatus as claimed in claim 14, wherein said base comprises at least one catch formed thereon and engagable with said port replicator to limit movement of said port replicator along a perpendicular direction away from said base in said first position of said port replicator.

17. The docking apparatus as claimed in claim 14, wherein said fixing member is separate from said button and receivably surrounded by a cutout of said button so as to be drivable by said button via said cutout.

* * * * *